United States Patent
Chu et al.

(10) Patent No.: US 12,087,066 B2
(45) Date of Patent: Sep. 10, 2024

(54) SYSTEMS FOR IDENTIFYING CELLS AND USES THEREOF

(71) Applicants: Chung Yuan Christian University, Taoyuan (TW); RIKEN, Saitama (JP)

(72) Inventors: Slo-Li Chu, Taoyuan (TW); Kuniya Abe, Saitama (JP); Hideo Yokota, Saitama (JP); Ming-Dar Tsai, Taoyuan (TW)

(73) Assignees: Chung Yuan Christian University, Taoyuan (TW); RIKEN, Saitama (JP)

( * ) Notice: Subject to any disclaimer, the term of this patent is extended or adjusted under 35 U.S.C. 154(b) by 370 days.

(21) Appl. No.: 17/715,975

(22) Filed: Apr. 8, 2022

(65) Prior Publication Data

US 2023/0326221 A1    Oct. 12, 2023

(51) Int. Cl.
| | |
|---|---|
| *G06V 20/69* | (2022.01) |
| *G06T 3/4046* | (2024.01) |
| *G06T 7/00* | (2017.01) |
| *G06T 7/10* | (2017.01) |

(52) U.S. Cl.
CPC ............ *G06V 20/69* (2022.01); *G06T 3/4046* (2013.01); *G06T 7/0012* (2013.01); *G06T 7/10* (2017.01); *G06T 2207/10056* (2013.01); *G06T 2207/20081* (2013.01); *G06T 2207/20084* (2013.01); *G06T 2207/30024* (2013.01)

(58) Field of Classification Search
CPC ......... G06V 20/69; G06T 7/10; G06T 3/4046; G06T 7/0012; G06T 2207/10056; G06T 2207/20081; G06T 2207/20084; G06T 2207/30024
See application file for complete search history.

(56) References Cited

U.S. PATENT DOCUMENTS

| | | | | |
|---|---|---|---|---|
| 11,514,325 B2 * | 11/2022 | Ozcan | ................... | G06V 10/82 |
| 2019/0064389 A1 * | 2/2019 | Denli | ...................... | G06N 3/08 |
| 2019/0384047 A1 * | 12/2019 | Johnson | ............ | G01N 15/1429 |
| 2023/0005140 A1 * | 1/2023 | Ferl | .......................... | G06T 7/11 |
| 2023/0069953 A1 * | 3/2023 | Chen | ...................... | H04N 19/50 |
| 2023/0186659 A1 * | 6/2023 | Martin | ................. | G06V 10/454 |
| | | | | 382/133 |
| 2023/0221239 A1 * | 7/2023 | Praljak | ................. | G06V 10/764 |
| | | | | 382/134 |

OTHER PUBLICATIONS

Du, Getao, et al. "Medical Image Segmentation based on U-Net: A Review." Journal of Imaging Science & Technology 64.2 (2020). (Year: 2020).*
Ronneberger, Olaf, Philipp Fischer, and Thomas Brox. "U-net: Convolutional networks for biomedical image segmentation." Medical image computing and computer-assisted intervention—MICCAI 2015: 18th international conference, Munich, Germany, Oct. 5-9, 2015 (Year: 2015).*

* cited by examiner

*Primary Examiner* — Utpal D Shah
(74) *Attorney, Agent, or Firm* — NZ CARR LAW OFFICE

(57) ABSTRACT

Disclosed herein are a system for identifying cells on a microscopic image. According to some embodiments, the system comprises a non-transitory processor-readable medium, and a processor communicably configured to receive the microscopic image, and process the received microscopic image with a convolutional neural network (CNN) model having a modified U-Net architecture. Also disclosed herein are methods for identifying a spatial pattern of human induced pluripotent stem cells (hiPSCs) by using the present system.

13 Claims, 10 Drawing Sheets

(A)  (B)  (C)

(D)  (E)  (F)

(G)

SYSTEMS FOR IDENTIFYING CELLS AND USES THEREOF

STATEMENT REGARDING PRIOR DISCLOSURES BY THE INVENTOR OR A JOINT INVENTOR UNDER 37 C.F.R. 1.77(B)(6)

Most of the subject matter of the invention described in the present application was published by the inventors, Slo-Li CHU, Kuniya Abe, Hideo Yokota, and Ming-Dar TSAI, in an article titled "High Resolution U-Net for Quantitatively Analyzing Early Spatial Patterning of Human Induced Pluripotent Stem Cells on Micropatterns." The article was disclosed during the 2021 43rd Annual International Conference of the IEEE Engineering in Medicine and Biology Society (EMBC) held between 31 Oct. to 4 Nov. 2021, and published online by IEEE Xplore on 9 Nov. 2021. Therefore, the publication or disclosure was made by and/or originated from all member of the inventive entity of the present invention less than one year before the filing date of the present application. A copy of the article is provided in a concurrently filed Information Disclosure Statement pursuant to the guidance of 78 Fed. Reg. 11076 (Feb. 14, 2013).

BACKGROUND OF THE INVENTION

1. Field of the Invention

The present disclosure in general relates to cell identification. More particularly, the present disclosure relates to a system for segmenting and identifying cells on microscopic images.

2. Description of Related Art

Human induced pluripotent stem cells (hiPSCs) are a type of pluripotent stem cells produced from somatic cells through co-expression of pluripotency-associated factors, also known as "reprogramming factors", such as transcription factors Oct3/4, Sox2, Klf4 and cMyc. Similar to embryonic stem cells (ESCs), hiPSCs can proliferate and self-renew indefinitely in vitro and differentiate into derivatives of three germ layers (i.e., ectoderm, mesoderm and endoderm). Based on the fully pluripotency, hiPSCs hold promise of widespread applications in different areas of biological and medical sciences, including drug screening, toxicological studies, disease modeling, cell therapy, tissue repair, organ synthesis and organ regeneration. Indeed, several hiPSC-based clinical trials are presently underway to treat diseases such as macular degeneration, spinal cord injury, graft-versus-host disease (GVHD), Parkinson's and cardiovascular diseases (e.g., ischemic cardiomyopathy and heart failure).

From the perspective of clinical use of hiPSCs, quality control (QC) of the cell lines is critical, as well as the pluripotency of hiPSCs (i.e., the ability of hiPSCs of differentiating into three germ layers), which should be evaluated before use. Embryoid body formation combined with expression analysis has been adopted for pluripotency evaluation (i.e., assessing the potential of three germ layers and their descendants formation in vitro). However, the procedures are time consuming and the results oftentimes are not reproducible nor quantitative.

HiPSCs differentiated on micropatterns form self-organized spatial patterns as they differentiating in the gastrulation stage of embryonic development. On the micropattern chips, hiPSCs generate self-organized patterns in a highly reproducible and synchronous manner, and would differentiate into three germ layers confined quickly to the circular micropattern and expanded two-dimensionally in almost monolayer. This two-dimensional (2D) patterning is ideal for cell analysis as compared to 3D embryoid bodies which preclude image analysis of internal structures. Nonetheless, the pluripotency of hiPSCs varies with factors such as cell lines, the origin of cells (e.g., cells derived from disease patients or healthy subjects), and culture condition (e.g., the shape and size of micropatterns, and transcription factors). Accordingly, many culturing tests have to be carried out for the application of hiPSC technology. Usually, cells differentiated on micropatterns are stained with antibodies against lineage markers for ectoderm, mesoderm, endoderm and extraembryonic cells, respectively. Means and deviations of the pluripotency for various hiPSC lines and culture conditions are then obtained via analyzing their time-lapse fluorescence images taken from micropattern cultures so as to analyze the pluripotency of the hiPSC.

In view of the foregoing, there is a continuing interest in developing a novel and easy-to-use technique to efficiently quantify and evaluate the pluripotency of hiPSCs.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

As embodied and broadly described herein, one aspect of the disclosure is directed to a non-transitory processor-readable medium for identifying cells. According to some embodiments of the present disclosure, the non-transitory processor-readable medium stores processor-readable instructions, which, when executed at a processor of a computing device, are capable of, (a) receiving a microscopic image, and (b) processing the received microscopic image with a convolutional neural network (CNN) model thereby generating a segmented image.

According to certain embodiments of the present disclosure, the CNN model has a U-Net architecture, which comprises a plurality of down-sampling sets, and a plurality of up-sampling sets respectively symmetric to the plurality of down-sampling sets. The down-sampling sets are configured to extract the features of the microscopic image thereby generating feature maps; and the up-sampling sets are configured to generate a segmented image from the feature maps. Structurally, each down-sampling set comprises at least one convolution layer and at least one pooling layer preceded by the convolution layer. According to the embodiments of the present disclosure, the extraction of the microscopic image is carried out by the plurality of down-sampling sets on a set-by-set basis by using equation (1), $$(x, y, C) = \left(\frac{h}{S^{i-1}}, \frac{w}{S^{i-1}}, 2^{F+i-1}\right), \quad (1)$$

where x and y are respectively the pixels of the height and width of an input image processed by each down-sampling set, C is the channel number of the input image, h and w are respectively the pixels of the height and width of the microscopic image, S is the stride of the pooling layer, i is the number of each down-sampling set in the plurality of down-sampling sets, and F is a constant for deciding the channel number of the input image.

According to some preferred embodiments, the pooling layer is a max-pooling layer. In some working examples, the S and F in equation (1) are respectively set to be 2 and 5.

According to certain embodiments, the present CNN model is established by a CNN training method comprising,
(a) inputting a plurality of training images to the CNN model to generate a plurality of predicted images;
(b) generating a plurality of ground truth images respectively corresponding to the plurality of training images; and
(c) determining a loss function for the CNN model based on the predicted images of step (a) and the ground truth images of step (b) by using equations (2)-(5), $$MPL(X, Y) = \alpha \times W(X, Y) + \beta \times D(X, Y), \quad (2)$$

$$W(X, Y) = \frac{1}{N}\sum_{j=1}^{N} E(X_j, Y_j) \times \gamma_j, \quad (3)$$

$$E(X_j, Y_j) = -Y_j \times \log X_j, \quad (4)$$

$$D(X, Y) = 1 - 2|X \cap Y|/(|X| + |Y|), \quad (5)$$

where $W(X,Y)$ is a weight loss function, $D(X,Y)$ is a dice loss function, $\alpha$ is the weight of $W(X,Y)$, $\beta$ is the weight of $D(X,Y)$, N is the number of the training images, X is the pixels of each predicted image, Y is the pixels of each ground truth image, j is a category selected from the group consisting of background, cell boundary, cell inside or a combination thereof for each pixel in the predicted and ground truth images, and $\gamma$ is the weight of the j category.

According to some embodiments, $\alpha$ and $\beta$ in equation (2) are respectively set to be 0.5-1.5. In some exemplary embodiments, $\alpha$ and $\beta$ are respectively set to be 1. According to certain preferred embodiments, $\alpha$ is set to be 1.1, and $\beta$ is set to be 0.9.

According to certain embodiments, in the case when j is set to be 1, then $\gamma_j$ is set to be 0.15; in the case when j is set to be 2, then $\gamma_j$ is set to be 0.25; in the case when j is set to be 3, then $\gamma_j$ is set to be 0.6.

The second aspect of the present disclosure is directed to a system for identifying cells on a microscopic image. The system comprises the non-transitory processor-readable storage medium of the present disclosure; and a processor communicably coupled to the non-transitory processor-readable storage medium. According to some embodiments, the non-transitory processor-readable storage medium stores instructions readable and executable by the process to receive and process the microscopic image as described above.

Also disclosed herein is a method for quantifying cells on a substrate by using the present system. The method comprises,
(a) labeling the nuclei of the cells;
(b) obtaining a microscopic image of the nucleus-labeled cells;
(c) processing the microscopic image by the system of the present disclosure; and
(d) quantifying the cells based on the result of step (c).

According to some embodiments, the cells are labeled by a fluorescent molecule, for example, a fluorescent nuclear dye.

According to certain working examples, the cells are human induced pluripotent stem cells (hiPSCs).

The present disclosure further provides a method for identifying a spatial pattern of hiPSCs by using the present system. The method comprises,
(a) respectively labeling the nuclei and one of the germ layers of the hiPSCs with a first and a second molecules;
(b) respectively obtaining a first microscopic image of the nucleus-labeled hiPSCs and a second microscopic image of the germ layer-labeled hiPSCs;
(c) producing a segmented image by processing the first microscopic image with the system of the present disclosure;
(d) superimposing the segmented image produced by step (c) on the second microscopic image of step (b); and
(e) identifying the spatial pattern of the hiPSCs based on the superimposed image of step (d).

According to some embodiments, the first molecule is a nuclear dye, and the second molecule is an antibody against one of the germ layers of the hiPSCs.

Depending on desired purposes, the antibody may be an anti-ectoderm antibody, an anti-mesoderm antibody or an anti-endoderm antibody.

Many of the attendant features and advantages of the present disclosure will becomes better understood with reference to the following detailed description considered in connection with the accompanying drawings.

BRIEF DESCRIPTION OF THE DRAWINGS

The present description will be better understood from the following detailed description read in light of the accompanying drawings, where:

FIG. 5A: the distribution of specified types of segmented cells on the micropattern chip, including SOX-2 positive, brachyury-positive and extraembryonic cells at early differentiation stage (24 hours after the onset) of the hiPSC differentiation. FIG. 5B: the distribution of specified subgroups of SOX2-positive cells on the micropattern chip. FIG. 5C: the distribution of specified subgroups of brachyury-positive cells on the micropattern chip.

FIG. 7A: the distribution of specified types of segmented cells on the micropattern chip, including SOX-17 positive, brachyury-positive and extraembryonic cells at early differentiation stage (24 hours after the onset) of the hiPSC differentiation. FIG. 7B: the distribution of specified subgroups of SOX17-positive cells on the micropattern chip. FIG. 7C: the distribution of specified subgroups of brachyury-positive cells on the micropattern chip.

Figure 1:
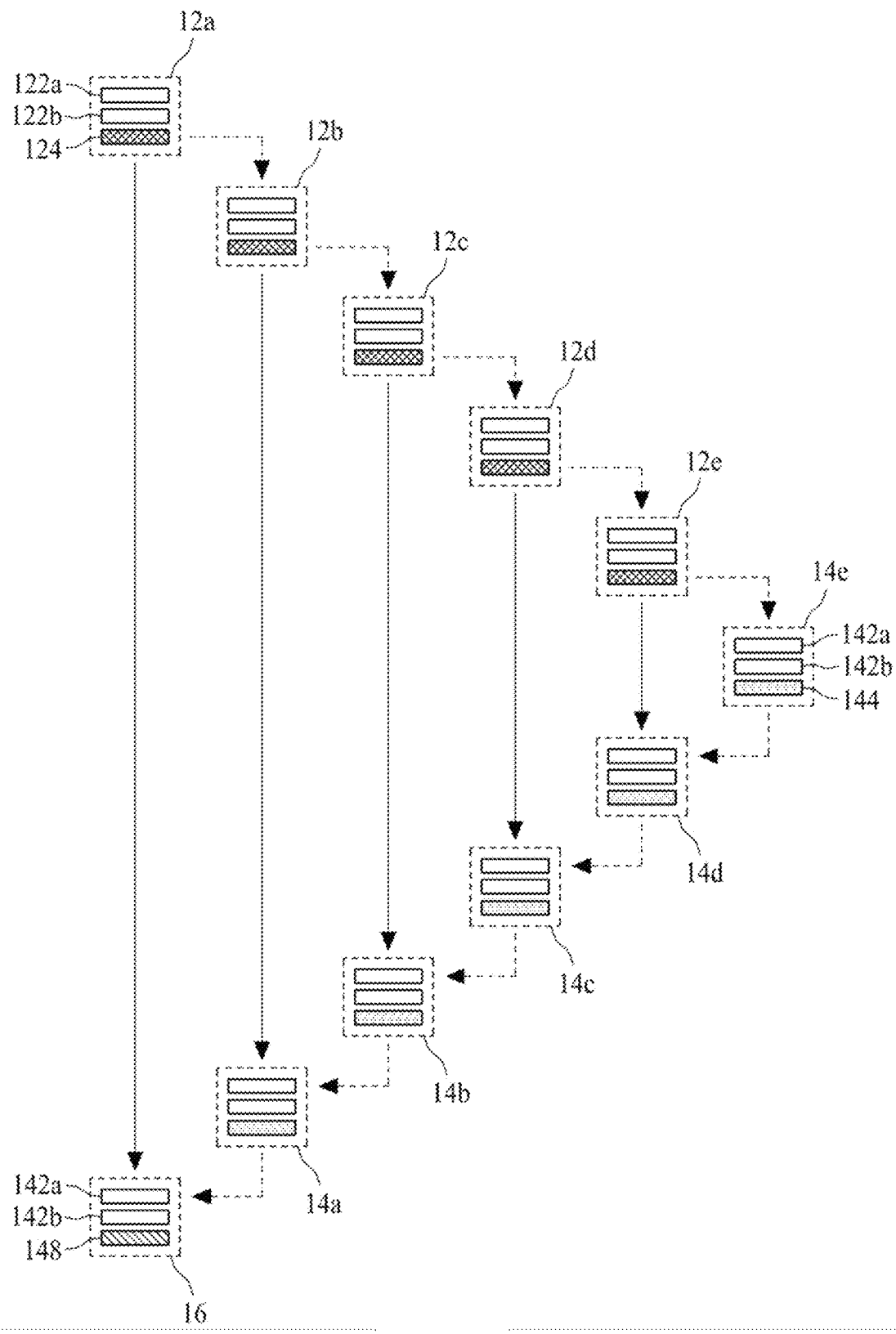
FIG. 1 is a block diagram depicting the U-Net architecture 10 according to one embodiment of the present disclosure.

In accordance with common practice, the various described features/elements are not drawn to scale but instead are drawn to best illustrate specific features/elements relevant to the present invention. Also, like reference numerals and designations in the various drawings are used to indicate like elements/parts.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

I. Definition

For convenience, certain terms employed in the specification, examples and appended claims are collected here. Unless otherwise defined herein, scientific and technical terminologies employed in the present disclosure shall have the meanings that are commonly understood and used by one of ordinary skill in the art. Also, unless otherwise required by context, it will be understood that singular terms shall include plural forms of the same and plural terms shall include the singular. Specifically, as used herein and in the claims, the singular forms "a" and "an" include the plural reference unless the context clearly indicates otherwise. Also, as used herein and in the claims, the terms "at least one" and "one or more" have the same meaning and include one, two, three, or more.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about". Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

As used herein, the term "processor-readable medium" refers to any medium capable of holding software accessible by a processor, including but not limited to, random access memory (RAM), read-only memory (ROM), erasable programmable read-only memory (EPROM), electrically-erasable programmable read-only memory (EEPROM), flash memory, or other solid-state memory technologies, such as compact disc read-only memory (CD-ROM), digital versatile disc (DVD), or optical storage, magnetic cassettes, magnetic tape, magnetic disk storage or other magnetic storage devices, and any other medium, which can be used to store the desired information and which can be accessed by the processor. A processor-readable medium may be located on a single device or computing platform or may be distributed across multiple devices or computing platforms.

The term "processor" as used herein refers to any device capable of executing one or more software instructions and includes, without limitation, a general- or special-purpose microprocessor, finite state machine, controller, computer, digital signal processor (DSP), or the like.

As discussed herein, the term "neural network" refers to software that implements statistical learning algorithms that are of an adaptive nature and are useful in machine learning. The neural network may include a plurality of artificial nodes, known as "neurons," "processing elements," "units," or by other similar terms and which are connected together to form a network that mimics a biological neural network. Generally, a neural network includes sets of adaptive weights (i.e., numerical parameters that are tuned by a learning algorithm), and is capable of approximating non-linear functions of the inputs. The adaptive weights are conceptually connection strengths between neurons, which are activated during training and prediction. Generally, a neural network operates on a principle of non-linear, distributed, parallel and local processing and adaptation. In the structure of a neural network, the first layer is called "input layer," and the neurons within the layer are called input neurons; the last layer is called "output layer" and contains output neurons; and intermediate layers are called "hidden layers," since the neurons in these layers are neither inputs nor outputs. Neurons may include feature detectors, gradients, and other such components.

As used herein, the term "convolutional neural network" (CNN) refers to a type of neural network where the individual neurons are tiled in such a way that they respond to overlapping regions in the visual field. The convolutional neural network (CNN) employs local receptive fields, shared weights, and pooling to process imagery. Local receptive fields may be considered as connections of input pixels to a layer of hidden neurons. As an example, each neuron in the first hidden layer corresponds to a small, localized region of the input image. The region of the input image that corresponds to the hidden neuron is called the "local receptive field" for that hidden neuron. Each of the hidden neurons in the first hidden layer use the same weights and bias as the other hidden neurons, and thus have "shared weights." This means that all the neurons in the first hidden layer detect exactly the same feature just in different locations. The resulting map from the input layer is referred to as a "feature map," and the weights defining the feature map as the "shared weights." "Pooling layers" are usually used immediately after convolutional layers. Pooling layers simplify the information in the output from the convolutional layer. That is, a pooling layer takes each feature map output from the convolutional layer and prepares a condensed feature map. One common procedure for pooling is known as "max-pooling." In max-pooling, a pooling unit simply outputs the maximum activation of the input region (output from the feature map).

As used herein, the term "pluripotent" refers to a cell with the capacity, under different conditions, to differentiate into cell types characteristic of all three germ cell layers, i.e., endoderm (e.g., gut tissue), mesoderm (including blood, muscle, and vessels), and ectoderm (such as skin and nerve). Accordingly, the terms "pluripotency" or a "pluripotent state" as used herein refer to the developmental potential of a cell that provides the ability for the cell to differentiate into all three embryonic germ layers.

Throughout the present disclosure, the term, "human induced pluripotent stem cells" or "hiPSCs", means that the stem cells are produced from differentiated human cells that have been induced or changed (i.e., "reprogrammed") into cells capable of differentiating into tissues of all three germ or dermal layers.

II. Description of the Invention

Image segmentation is the process of clustering parts of an image together that belong to the same object class so as to subdivide the image into multiple segments. It is a form of pixel-level prediction because each pixel in the image is classified according to a category. The goal of image segmentation is to simplify the image and render subsequent image analysis easier. Image segmentation is practically implemented in many applications, such as cell/tissue identification, medical imaging, object detection, feature recognition (such as face recognition, fingerprint recognition, iris recognition and object recognition) and real-time object tracking in video. U-Net (also known as "encoder-decoder neural network architecture") is a convolutional network architecture developed for image segmentation. As its name implies, U-Net has a U-shaped architecture consisting of a down-sampling path (also known as "a contracting path" or "encoder") and a corresponding up-sampling path (also known as "an expansive path" or "decoder"). The down-sampling path includes stacks of convolution and pooling layers for extracting features of an input image. During the extraction process, the spatial information of the input image is reduced while the feature information of the input image is increased. The up-sampling path includes stacks of convolution and up-sampling layers that combines the spatial and feature information by a sequence of up-convolutions and includes a concatenation of feature maps from a corresponding layer in the down-sampling path through a skip connection. The architecture of U-Net is well known in the art; for example, the reference may be made to the publication of Olaf Ronneberger et al. (U-Net: Convolutional Networks for Biomedical Image Segmentation, Medical Image Computing and Computer-Assisted Intervention—MICCAI 2015; pp 234-241).

The present disclosure aims at providing a CNN model having a modified U-Net architecture, which is characterized by extracting features of input data with a unique equation in the down-sampling pathway. Compared to conventional CNN model, the present CNN model is more efficient and accurate in segmenting and identifying cells, and accordingly, provides a potential means to quantify and analyze cells, e.g., determining the cell number and spatial pattern of hiPSCs.

(I). The Present U-Net Architecture

Reference is now made to FIG. 1, which depicts the U-Net architecture 10 in accordance with one embodiment of the present disclosure. The U-Net architecture 10 includes a down-sampling path and an up-sampling path, in which the down-sampling path includes five down-sampling sets (12a, 12b, 12c, 12d, 12e), and the up-sampling path includes five up-sampling sets (14a, 14b, 14c, 14d, 14e). As depicted in FIG. 1, each down-sampling set comprises two convolution layers 122a, 122b, and one pooling layer 124; and each up-sampling set comprises two convolution layers 142a, 142b, and one up-sampling layer 144. In operation, the down-sampling sets (12a, 12b, 12c, 12d, 12e) are configured to extract the features of an input image (e.g., a microscopic image) and generate feature maps on a set-by-set basis as depicted by the dash arrows in FIG. 1, in which the number of feature maps increases, and the spatial resolution decreases, in a set-by-set manner. On the contrary, the up-sampling sets (14a, 14b, 14c, 14d, 14e) are configured to perform a transpose convolution (i.e., reversing the convolution operation of the down-sampling sets; See, the dash arrows in FIG. 1) that combines the information (including the spatial and feature information), and further includes a concatenation of feature maps from the corresponding down-sampling set (See, the arrows in FIG. 1). In the up-sampling path, the number of feature maps decreases, and the spatial resolution increases in a set-by-set manner so as to generate a segmented image in the output set 16, which, in addition to the convolution layers 142a, 142b, further comprises an output layer 148 to produce a network output. The network architecture of the present U-Net is quite similar to that of conventional U-Net (such as the U-Net architecture of Olaf Ronneberger et al.); hence, the detailed description is omitted for the sake of brevity.

As described above, compared to conventional U-Net architecture, the present U-Net architecture is characterized by extracting the features of an input data (e.g., a microscopic image) with a unique function (i.e., equation (1)) in the down-sampling pathway. According to some embodiments of the present disclosure, the feature extraction of a microscopic image is carried out by the down-sampling sets (12a, 12b, 12c, 12d, 12e), set by set, via equation (1), $$(x, y, C) = \left(\frac{h}{S^{i-1}}, \frac{w}{S^{i-1}}, 2^{F+i-1}\right), \quad (1)$$

where x and y are respectively the pixels of the height and width of an input image processed by each of the down-sampling sets (12a, 12b, 12c, 12d, 12e, 12f), C is the channel number of the input image, h and w are respectively the pixels of the height and width of the microscopic image, S is the stride of the pooling layer 124, i is the number of each down-sampling set in the plurality of down-sampling sets (12a, 12b, 12c, 12d, 12e), and F is a constant for deciding the channel number of the input image.

Preferably, the pooling layer 124 is a max-pooling layer where the kernel (also known as "filter") extracts the maximum value of the area it convolves. In some exemplary embodiments, the present U-Net architecture includes a convolutional kernel of size 2×2.

According to some exemplary embodiments, the microscopic image has a pixel size of 256×256 pixels (i.e., having a height h of 256 pixels and a width w of 256 pixels). In these embodiments, the stride S is set to be 2, and the constant F is set to be 5. By this manner, the input of the first down-sampling set 12a (i=1) is (256, 256, 32), the input of the second down-sampling set 12b (i=2) is (128, 128, 64), the input of the third down-sampling set 12c (i=3) is (64, 64, 128), the input of the fourth down-sampling set 12d (i=4) is (32, 32, 256), the input of the fifth down-sampling set 12e (i=5) is (16, 16, 512), and the input of the first up-sampling set 14e (i=6) is (8, 8, 1024).

Additionally or optionally, each of the convolution layers 122, 124 is followed by a rectified linear unit (ReLU), a form of activation function for deep learning model. Alternatively, other non-linear activation functions, such as parametric ReLU (PReLU) and exponential linear unit (ELU) may be used in the present U-Net architecture.

As could be appreciated, the parameters of the present U-Net architecture, such as the number of the down-sampling sets/corresponding up-sampling sets, the number of the convolution layer in each down-sampling/up-sampling layer, the type, kernel and stride of the pooling layer, and the channel number of the input image, may vary with intended purposes. For example, the U-Net architecture may include 4, 5, 6, 7, 8, 9, 10, 11, 12 or more down-sampling sets and corresponding up-sampling sets, in which each of the down-sample sets and up-sampling set may independently include 1, 2, 3, 4, 5, 6, 7, 8, 9, 10 or more convolution layers; the pooling layer may be a max-pooling layer or an average pooling layer, in which the kernel size may be 2×2, 3×3, 4×4, or 5×5 with a stride of 1, 2 or 3; and the channel number of the input image may be $2^1$, $2^2$, $2^3$, $2^4$, $2^5$, $2^6$, $2^7$, $2^8$, $2^9$, $2^{10}$, $2^{11}$, $2^{12}$, $2^{13}$, $2^{14}$, $2^{15}$, $2^{16}$ or more.

According to some exemplary embodiments, the U-Net architecture of the present CNN model comprises 5 down-sampling sets and 5 up-sampling sets, in which each down-sampling set comprises two 3×3 convolution layers, each followed by a ReLU, and one 2×2 max-pooling layer with a stride of 2; and each up-sampling set comprises two 3×3 convolution layers, each followed by a ReLU, and one 2×2 up-sampling layer.

Figure 2:
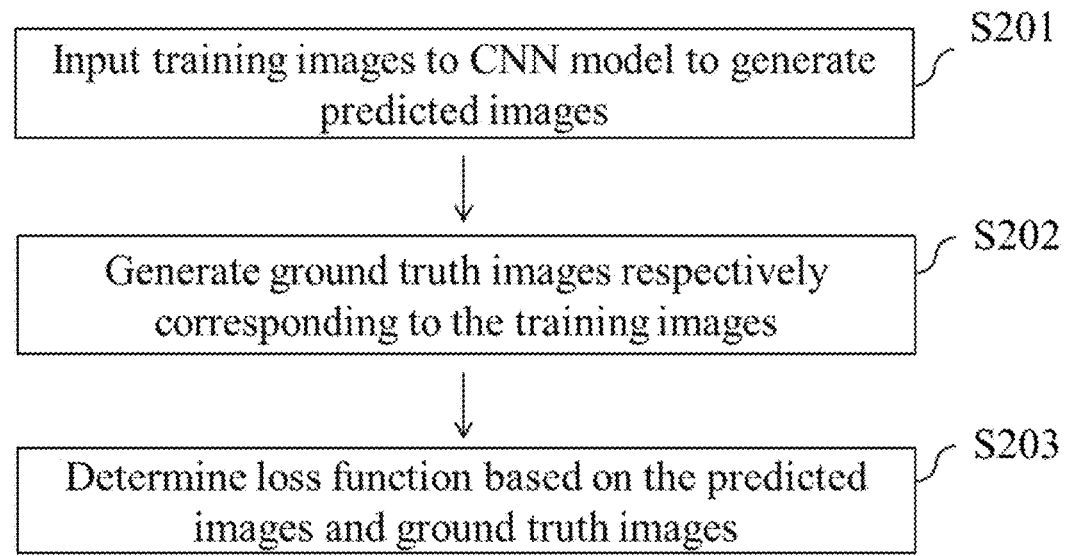
FIG. 2 is a flow diagram illustrating the CNN training process 20 according to another embodiment of the present disclosure.

According to certain embodiments of the present disclosure, the present CNN model is trained with a weight loss function and a dice loss function. Reference is now made to FIG. 2, which depicts a flow diagram illustrating the CNN training process 20 comprising steps S201, S202, S203 for training the present CNN model.

First, a plurality of training images are inputted to the CNN model so as to generate a plurality of predicted images (S201). Although the number of the training images does not restrict the present embodiment, however, in one exemplary CNN training process, a total of 720 training images are used. In another exemplary CNN training process, a total of 9,000 training images are used.

Then, the actual image content (i.e., the contours or boundaries of cells) of the training images is artificially defined so as to generate a plurality of ground truth images respectively corresponding to the training images (S202). According to one exemplary embodiment, a total of 720 training images are used to train the CNN model, and accordingly, 720 ground truth images are generated. According to another exemplary embodiment, a total of 9,000 training images are used to train the CNN model, and accordingly, 9,000 ground truth images are generated.

In the step S203, the predicted images of S201 and the ground truth images of S202 are used to determine a loss function for the CNN model by using equations (2)-(5), $$MPL(X, Y) = \alpha \times W(X, Y) + \beta \times D(X, Y), \quad (2)$$

$$W(X, Y) = \frac{1}{N}\sum_{j=1}^{N} E(X_j, Y_j) \times \gamma_j, \quad (3)$$

$$E(X_j, Y_j) = -Y_j \times \log X_j, \quad (4)$$

$$D(X, Y) = 1 - 2|X \cap Y|/(|X| + |Y|), \quad (5)$$

where W(X,Y) is a weight loss function, D(X,Y) is a dice loss function, α is the weight of W(X,Y), β is the weight of D(X,Y), N is the number of the training images, X is the pixels of each predicted image, Y is the pixels of each ground truth image, j is a category selected from the group consisting of background, cell boundary, cell inside or a combination thereof for each pixel in the predicted and ground truth images, and γ is the weight of the j category.

According to some embodiments, α and β in equation (2) are respectively set to be 0.5-1.5. In some exemplary embodiments, α and β are respectively set to be 1. According to certain preferred embodiments, α is set to be 1.1, and β is set to be 0.9.

According to certain embodiments, j is set to be 1 (i.e., any one category of background, cell boundary and cell inside); in these embodiments, $\gamma_j$ is set to be 0.15. According to some embodiments, j is set to be 2 (i.e., any one category of background, cell boundary and cell inside); in these embodiments, $\gamma_j$ is set to be 0.25. According to alternative embodiments, j is set to be 3 (i.e., any one category of background, cell boundary and cell inside); in these embodiments, $\gamma_j$ is set to be 0.6.

According to one exemplary embodiment, 720 training images (720 predicted image) and 720 ground truth images are used to train the CNN model; in this embodiment, N is set to be 720. According to another exemplary embodiment, 9,000 training images (9,000 predicted image) and 9,000 ground truth images are used to train the CNN model; in this embodiment, N is set to be 9,000.

Additionally or optionally, the trained CNN model may be optimized by repeating the training steps S201, S202, S203 so as to improve the accuracy of the CNN model in determining microscopic images with compacted cells and low signal-to-noise and boundary-to-area ratios. In the two-stage training process, the first training stage is based on the microscopic image of a first type of cells, and the second training stage is based on the microscopic image of a second type of cells, which is different from that of the first type of cells. According to certain exemplary embodiments, the CNN model of the present disclosure is designed to identify hiPSCs. In these embodiments, the first training stage is based on the microscopic image of mouse embryonic stem cells (mESCs) having a clear image pattern and mild contact, i.e., using the microscopic images of mESCs as the training images in the step S201, generating ground truth images corresponding thereto in the step S202, and then determining the loss function based on the mESC-based training and ground truth images in the step S203; and the second training stage is based on the microscopic image of hiPSCs having low signal-to-noise and boundary-to-area ratios, i.e., using the microscopic images of hiPSCs as the training images in the step S201, generating ground truth images corresponding thereto in the step S202, and then determining the loss function based on the hiPSC-based training and ground truth images in the step S203.

As described above, U-Net is a convolutional network architecture developed for image segmentation. However, conventional U-Net architecture has limitation in different aspects; for example, the dimensions of the input and output images of conventional U-Net architecture are fixed, and resizing the image dimensions would decrease the segmentation accuracy. According to some embodiments of the present disclosure, compared to conventional U-Net architecture, the modified U-Net architecture of the present invention is advantageous in having dynamic encoding and decoding layer stacks (i.e., down-sampling and up-sampling sets) and dynamic size of input image so as to accommodate various sizes of images, and extracting more image features for various micropattern chips. Further, the dice and weight loss functions also improve the improve the accuracy of the present CNN model in identifying microscopic images with compacted cells and low signal-to-noise and boundary-to-area ratios.

(II). Systems Comprising the Preset CNN Model and Uses Thereof

According to some embodiments of the present disclosure, the segmented image obtained by the present CNN model exhibits clear cellular boundaries with high signal-to-noise and boundary-to area ratios, and accordingly, is useful in identifying cells in a more efficient and accurate manner.

Figure 3A:
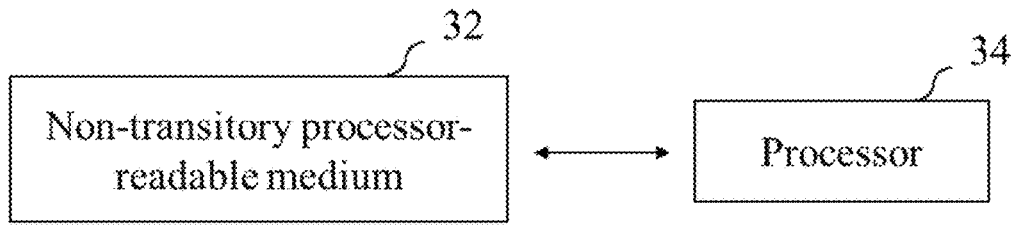
FIGS. 3A and 3B are block diagrams respectively depicting the system 30A and system 30B according to some embodiments of the present disclosure.

Thus, one aspect of the present disclosure is directed to a system for identifying cells on a microscopic image. Reference is now made to FIG. 3A, which depicts a block diagram of the system 30A in accordance with one embodiment of the present disclosure. As depicted in FIG. 3A, the system 30A comprises in its structure, a non-transitory processor-readable medium 32 and a processor 34 communicably coupled to the non-transitory processor-readable medium 32. The non-transitory processor-readable medium 32 stores a plurality of instructions, which, when executed by the processor 34, causes the processor 34 to receive the microscopic image, and then process the received microscopic image with the present CNN model.

Figure 3B:
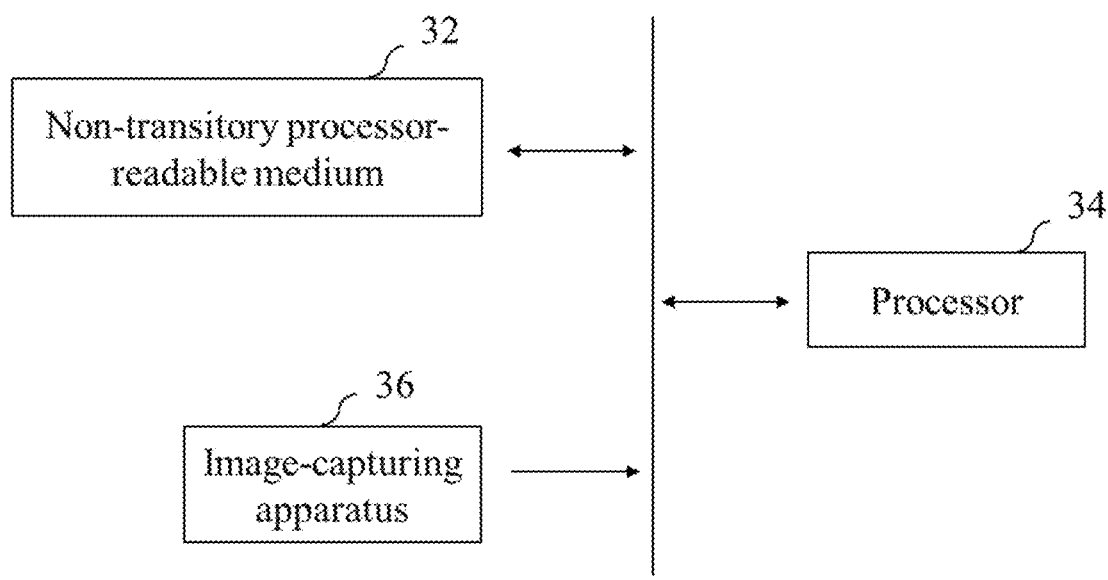

Optionally, the present system further comprises an image-capturing apparatus for obtaining the microscopic image of cells. FIG. 3B is a block diagram depicting the system 30B in accordance with another embodiment of the present disclosure. In addition to the non-transitory processor-readable medium 32 and the processor 34 as depicted in FIG. 3A, the system 30B further comprises an image-capturing apparatus 36 communicably coupled to the processor 34. The image-capturing apparatus may be, for example, any suitable optical microscope.

In operation, the image-capturing apparatus 36 takes a microscopic image of cells and uses it as an input image. Next, the input image is transferred to and processed by the processor 34 with the present CNN model.

The communication between the image-capturing apparatus and the processor, may be achieved via various known techniques. For example, the present system may comprise a network interface to permit communications between the image-capturing apparatus and the processor over a network (such as a local area network (LAN), a wide area network (WAN), the Internet, a bluetooth, or a wireless network). In another example, the present system may have an infrared (IR) light that couples with the image-capturing apparatus and the processor. In yet another embodiment, the present system may have a radio frequency (RF) for coupling the image-capturing apparatus and the processor via electromagnetic radio waves.

Alternatively, the microscopic may be transferred to the processor via data interface, for example, universal serial bus (UBS), serial port or parallel port.

Also disclosed herein are uses of the present system in quantifying and identifying cells, for example, hiPSCs.

In one aspect of the present disclosure, a method for quantifying cells on a substrate is provided. The method comprises, (a) labeling the nuclei of the cells;
(b) obtaining a microscopic image of the labeled cells;
(c) processing the microscopic image by the system of the present disclosure; and
(d) quantifying the cells based on the result of step (c).

The cells may be any eukaryotic cells (i.e., cells containing organized nucleus), for example, cells derived from mouse, rat or human. According to one exemplary embodiment, the cells are hiPSCs.

Basically, the substrate may be any materials for supporting cell adhesion and/or growth, for example, culture plate, dish, slide, chip or chamber. According to some exemplary embodiments, the cells are cultured on micropatterned substrate, a culture substrate known by a skilled artisan that mimics in vivo microenvironments of cells and allows users to culture cells under well-defined geometric confinement by controlling cell shape, size, position, or multi-layered architecture; in these embodiments, cells are expanding two-dimensionally in the form of monolayer.

In the step (a), the nuclei of the cells are labeled by a reporter molecule, for example, a nuclear dye. Examples of nuclear dye suitable for labeling the nuclei of cells include, but are not limited to, Hoechst, 4′,6-diamidino-2-phenylindole (DAPI), propidium iodide (PI), TO-PRO®-3, SYTOX®, NUCSPOT®, BIOTRACKER™, PUREBLU™, DRAQ5™ and DRAQ7™. Alternatively, the nucleic of cells may be labeled by any molecules known to stain cell nucleus. According to some exemplary embodiments, the nuclei of the cells are labeled by Hoechst dye.

The image of labeled cells is captured by a microscope (i.e., a microscopic image, step (b)), and the captured image is then processed by the present system (step (c)). According to some exemplary embodiments, a fluorescent image of Hoechst-labeled cells is captured, and the channel number of the input image C in equation (1) of the present CNN model is set to be 1 for processing one fluorescent color (i.e., the blue fluorescence emitted by Hoechst dye).

As described above, the segmented image obtained by the present CNN model exhibits clear cellular boundaries with high signal-to-noise and boundary-to area ratios, and accordingly is useful in quantifying cells on the substrate (step (d)). According to one working example, compared to conventional CNN model having 75% accuracy in quantifying cells, the present CNN model gives an accuracy of more than 87% in quantifying cells.

Pluripotent stem cells are able to differentiate into three germ layers (i.e., endoderm, mesoderm and ectoderm) in the gastrulation stage of embryo development, and extraembryonic cells (non-embryonic cells) that form non-fetal parts such as the placenta. According to some embodiments of the present disclosure, the present system is useful in determining the distributions of three germ layers, as well as the distribution of extraembryonic cells.

The present disclosure thus provides a method for identifying a spatial pattern of hiPSCs. The method comprises, (a) respectively labeling the nuclei and one of germ layers (e.g., ectoderms, mesoderms or endoderms) of the hiPSCs with a first and a second molecules;

(b) respectively obtaining a first microscopic image of the nucleus-labeled hiPSCs and a second microscopic image of the germ layer-labeled hiPSCs;

(c) producing a segmented image by processing the first microscopic image with the system of the present disclosure;

(d) superimposing the segmented image produced by step (c) on the second microscopic image of step (b); and (e) identifying the spatial pattern of the hiPSCs based on the superimposed image of step (d).

In the step (a), the hiPSCs are incubated with a first and a second molecules so as to respectively label the nuclei and germ layers of the hiPSCs. According to some working examples, the first molecule is a fluorescent nuclear dye (e.g., Hoechst, DAPI, PI, TO-PRO®-3, SYTOX®, NUCSPOT®, BIOTRACKER™, PUREBLU™, DRAQ5™ or DRAQ7™), and the second molecule is an antibody against one of the germ layers of hiPSC (for example, an anti-ectoderm, anti-mesoderm or anti-endoderm antibody). In one embodiment, the nuclei of the hiPSCs are labeled by Hoechst dye (a blue fluorescent dye), and the ectoderms of the hiPSCs are labeled by an antibody specific to SOX2 (a lineage marker of ectoderm). In another embodiment, the nuclei of the hiPSCs are labeled by Hoechst dye, and the mesoderms of the hiPSCs are labeled by an antibody specific to brachyury (a lineage marker of mesoderm). In still another embodiment, the nuclei of the hiPSCs are labeled by Hoechst dye, and the endoderms of the hiPSCs are labeled by an antibody specific to SOX17 (a lineage marker of endoderm). Preferably, the antibody is conjugated with a fluorophore other than a blue fluorophore so that the labeled hiPSCs could be detected by a fluorescence microscopy via different channels.

In the step (b), the microscopic images of the labeled hiPSCs are captured by use of two different channels of a microscope thereby producing a first microscopic image of the nucleus-labeled hiPSCs, and a second microscopic image of the germ layer-labeled hiPSCs (i.e., ectoderm-labeled hiPSCs, mesoderm-labeled hiPSCs or endoderm-labeled hiPSCs). According to one embodiment, the hiPSCs are labeled with a Hoechst dye and an anti-ectoderm antibody conjugated with a green fluorophore in the step (a); in this embodiment, the first and second microscopic images in the step (b) respectively display blue fluorescent nuclei and green fluorescent ectoderm. According to another embodiment, the hiPSCs are labeled with a Hoechst dye and an anti-mesoderm antibody conjugated with a red fluorophore in the step (a); in this embodiment, the first and second microscopic images in the step (b) respectively display blue fluorescent nuclei and red fluorescent mesoderm. According to still another embodiment, the hiPSCs are labeled with a Hoechst dye and an anti-endoderm antibody conjugated with a red fluorophore in the step (a); in this embodiment, the first and second microscopic images in the step (b) respectively display blue fluorescent nuclei and red fluorescent endoderm.

In the step (c), the first microscopic image is processed with the present system thereby producing a segmented image.

Then, in the step (d), the segmented image of step (c) is superimposed on the second microscopic image via an image superimposing technology thereby producing a combined image of the segmented image and the germ layer image.

In the step (e), the spatial pattern of the hiPSCs based on the merged information of the combined image is determined.

For the purpose of determining the distribution of extraembryonic cells, the method further comprises, (f) obtaining a third microscopic image of hiPSCs;

(g) generating a probability map by processing the third microscopic image of step (f) with a CNN model;

(h) superimposing the segmented image produced by step (c) on the probability map of step (g); and (i) identifying the spatial pattern of the extraembryonic cells based on the superimposed image of step (h).

In the step (f), a microscopic image of hiPSCs is captured by a microscope so as to obtain a bright-field image of the hiPSCs.

In the step (g), the bright-field image is processed by a trained CNN model, which calculates and outputs the probability of each pixel of the bright-field image, in which the probabilities of each and every pixels are assigned to a plurality of classes, so as to generate a probability mage.

Next, in the step (h), the segmented image of step (c) is superimposed on the probability mage of step (g) via an image superimposing technology thereby producing a combined image of the segmented image and the probability mage.

Based on the merged information, the spatial pattern of the extraembryonic cells is determined in the step (i).

The following Examples are provided to elucidate certain aspects of the present invention and to aid those of skilled in the art in practicing this invention. These Examples are in no way to be considered to limit the scope of the invention in any manner. Without further elaboration, it is believed that one skilled in the art can, based on the description herein, utilize the present invention to its fullest extent. All publications cited herein are hereby incorporated by reference in their entirety.

EXAMPLE

Materials and Methods

Imaging Condition

In the study of determining the distribution of ectoderm and mesoderm subtypes, HiPSCs cultured and differentiated on micropattern chip were stained with Hoechst dye, green fluorescent protein (GFP) conjugated anti-SOX2 antibody, and red fluorescent protein (RFP) conjugated anti-brachyury antibody. One set of microscopic images in four channels were acquired, including one bright-field image, and fluorescent images of Hoechst, SOX2 and brachyury, with a pixel resolution of 0.461×0.461 μm$^2$, with resolution of 2560×2560 for size of 1,000 μm and 1280×1280 for 500 μm on the micropatterns.

In the study of determining the distribution of mesoderm and endoderm subtypes, HiPSCs cultured and differentiated on micropattern chip were stained with Hoechst dye, GFP conjugated anti-brachyury antibody, and RFP conjugated anti-SOX17 antibody. One set of microscopic images in four channels were acquired, including one bright-field image, and fluorescent images of Hoechst, brachyury and SOX17, with a pixel resolution of 0.461×0.461 µm², with resolution of 2560×2560 for size of 1,000 µm on the micropattern.

U-Net Architecture

The present U-Net architecture consisted of two symmetric parts for extracting cell features, including down-sampling and up-sampling parts. Each part consisted of variable numbers of layer sets. Each set was composed by two layers of convolution and ReLU, together with one max-pooling layer. These sets in the down-sampling sets refined the cell features with particular dimensions to generate corresponding feature maps. Meanwhile, the up-sampling sets processed the feature map to generate the segmented cell image through the symmetric layer sets.

The input image was represented as (h, w, c), in which h and w indicated the input image size that can be flexible, and c indicated the channel number. Although the channel number c can be flexible in the present system, it was set to be 1 in the current study indicating one fluorescence/color was processed. The input (x, y, C) of a specific layer set in down-sampling was calculated by equation (1), $$(x, y, C) = \left(\frac{h}{S^{i-1}}, \frac{w}{S^{i-1}}, 2^{F+i-1}\right), \quad (1)$$

where S was the stride of max-pooling layer to the convolution and ReLU layers, i was the number (from 1 to M) of the layer set, F was a constant for deciding channels of the layer sets. F and S were respectively set be to 5 and 2 in the current study. Meanwhile, the input of a specific layer set in up-sampling was symmetric to the ones in the down-sampling as depicted in FIG. 1.

Loss Function of U-Net Architecture

During training, the loss function, MPL(X, Y), was used to improve segmenting accuracy for compacted hiPSCs of early spatial patterning on micropatterns. MPL (X, Y) was a linear combination of a weight loss function W(X, Y) and a dice loss function D(X, Y) as described in equation (2), and were set to be 1 in the current study. $X=[X_1, X_2, \ldots, X_{xy-1}, X_{xy}]$ indicated the pixels of the image predicted by U-Net. $Y=[Y_1, Y_2, \ldots, Y_{xy-1}, Y_{xy}]$ indicated the pixels of the ground truth image. W(X, Y), calculated based on cross-entropy function as described in equations (3) and (4), was used to emphasize some categories. $r_j$ in equation (4) indicated the weights of j categories (including background, cell boundary and cell inside for each pixel in the predicted and ground truth images), and was used to determine the category importance. For example, the highest value was at the cell boundary. D(X, Y) can reveal the particular category with larger numbers and reduce the loss value;

$$MPL(X, Y) = \alpha \times W(X, Y) + \beta \times D(X, Y), \quad (2)$$

$$W(X, Y) = \frac{1}{N}\sum_{j=1}^{N} E(X_j, Y_j) \times \gamma_j, \quad (3)$$

$$E(X_j, Y_j) = -Y_j \times \log X_j, \quad (4)$$

$$D(X, Y) = 1 - 2|X \cap Y|/(|X| + |Y|). \quad (5)$$

The present CNN model was established by two-stage training process using equations (2) to (5). In the first stage, 1,200 (256×256 pixels) clipped from mESCs nucleus confocal fluorescent images were used to learn the cells with clear image patterns and mild contact. In the second stage, 240 (256×256 pixels) templates clipped from the Hoechst images were used to further learn the cell features on the Hoechst images. Such size of templates was tested as optimal to learn the cell features on the Hoechst images.

Figure 4:
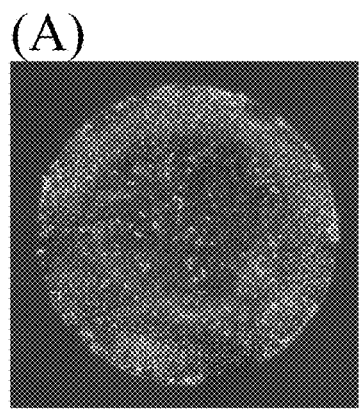
FIG. 4 depicts early differentiation stage of hiPSCs cultured on 1,000 μm micropattern chip according to the Example 1 of the present disclosure. Panel (A): the bright-field image of hiPSCs. Panels (B) to (D): photographs of unprocessed Hoechst-positive cells (Panel (B)), brachyury-positive cells (Panel (C)) and SOX2-positive cells (Panel (D)). Panels (E) and (F): photograph of segmented cells assigned by brachyury fluorescence (Panel (E)) and SOX2 fluorescence (Panel (F)). Panel (G): photograph of segmented cells assigned by brachyury fluorescence, SOX2 fluorescence and extraembryonic cells.
Figure 4:
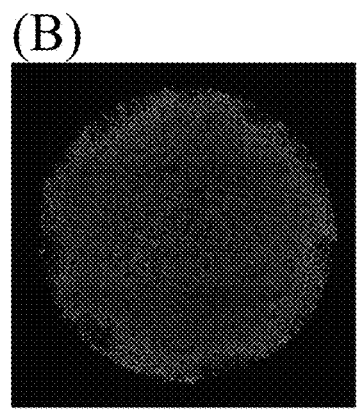
Figure 4:
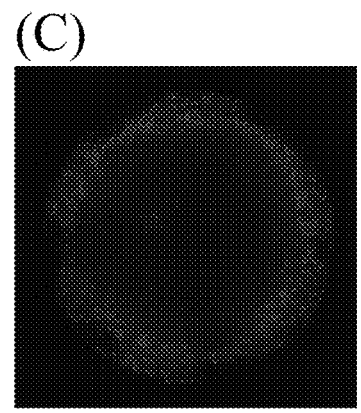
Figure 4:
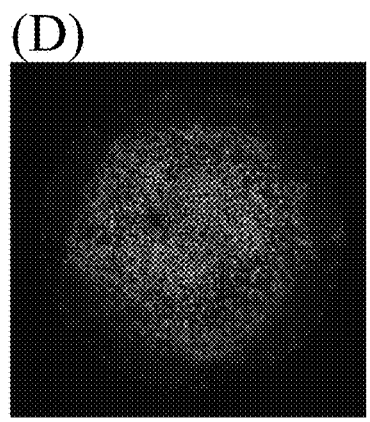
Figure 4:
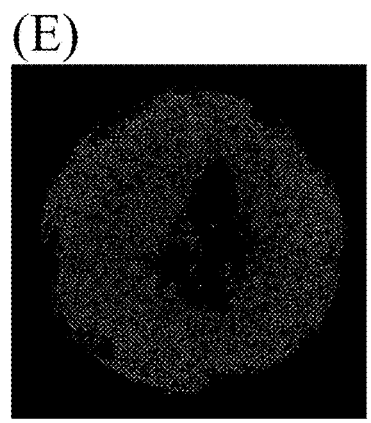
Figure 4:
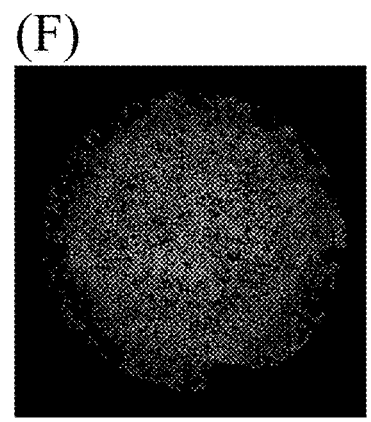
Figure 4:
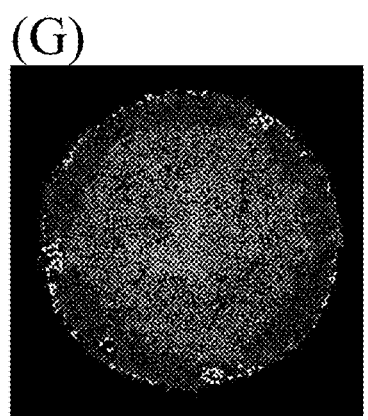

Example 1 Quantitative Analysis of Early Differentiation Stage of hiPSCs Cultured on 1,000 µm Micropattern Chip The effect of the present CNN model on characterizing the spatial patterning of hiPSCs cultivated on 1,000 µm micropattern chip was examined in this example. Whether a Hoechst-positive cell corresponds to the ectoderm or mesoderm or others was first determined by processing the Hoechst image with the CNN model to generate a segmented image, followed by mapping the segmented image to both the SOX2 and brachyury fluorescent images. Panels (A) to (D) of FIG. 4 respectively depict the bright-field image, and the original Hoechst, brachyury and SOX2 fluorescent images. The segmented images mapping to the brachyury fluorescence image (red) and the SOX2 fluoresce image (green) were respectively depicted in Panels (E) and (F) of FIG. 4. Based on the mapping results, the hiPSCs could be classified as SOX2- or brachyury-positive cells via comparing the intensities of the mapped region on the SOX2 and brachyury images. Specifically, in the case when the cell was both SOX2- and brachyury-positive, it was assigned to be the one with higher intensity. On the contrary, in the case when the cell was both SOX2- and brachyury-negative, it was assigned to be a Hoechst-positive cell. The segmented image was alternatively mapped to a probability map generated by processing the bright-field image with a CNN model so as to identity extraembryonic cells. The data of Panel (G) of FIG. 4 indicated that some Hoechst-negative cells (i.e., extraembryonic cells) exited near the outmost part of the micropattern chip. Based on the result, a cell was assigned as one of the four colors, including SOX2 fluorescence (green), brachyury fluorescence (red), Hoechst fluorescence (blue), and extraembryonic (gray) (data not shown). A cell on the SOX2 or brachyury image was further classified as any one of four levels according to its intensity on the SOX2 or brachyury image that may reveal the cell as some ectoderm or mesoderm subtype.

Figure 5A:
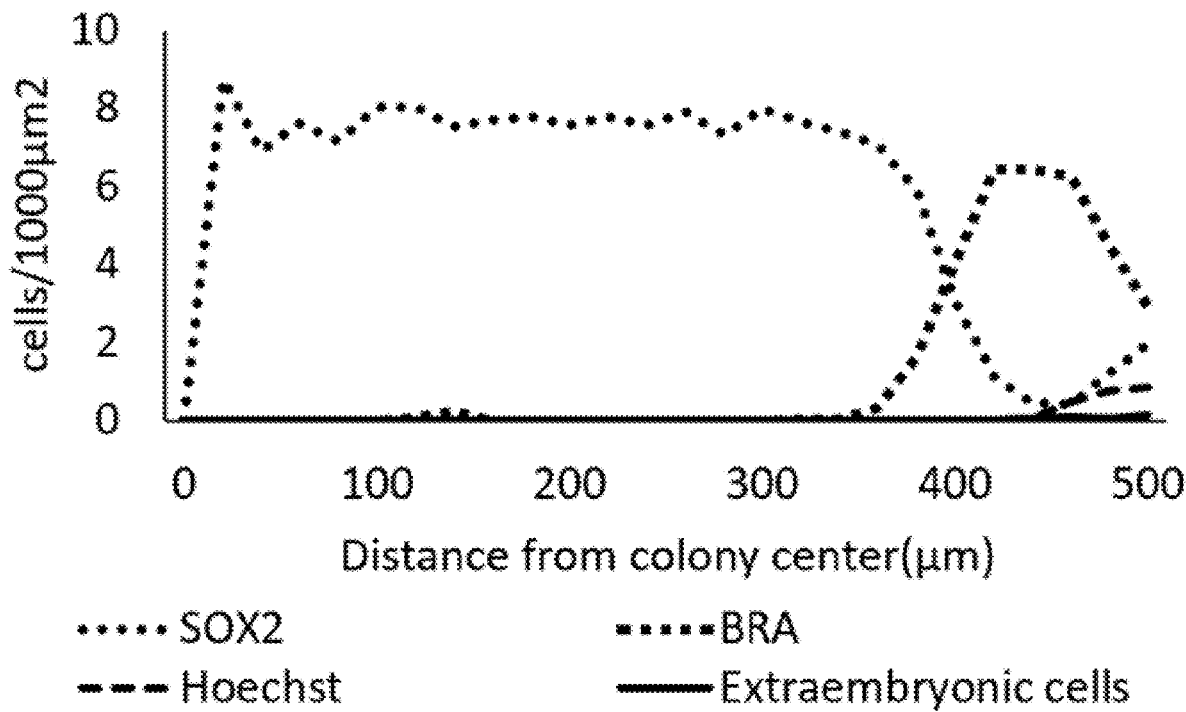
FIGS. 5A to 5C respectively depict the quantitative results of early differentiation stage of hiPSCs cultured on 1,000 μm micropattern chip according to the Example 1 of the present disclosure.
Figure 5B:
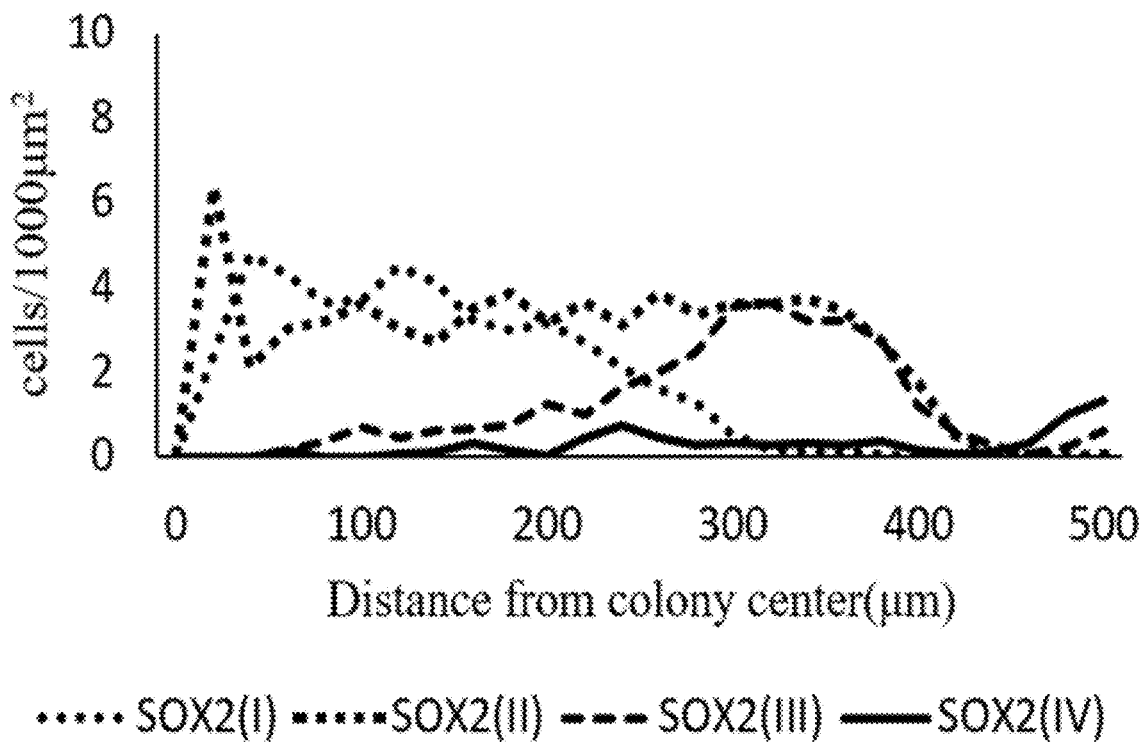
Figure 5C:
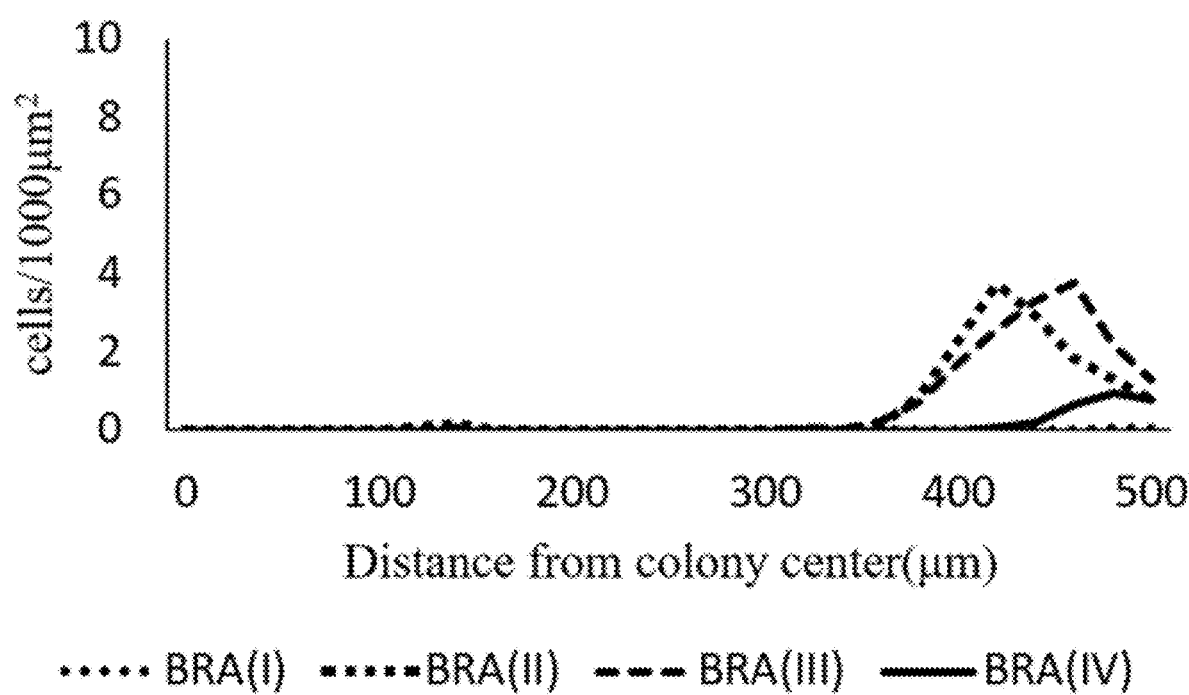

The data of FIG. 5A indicated the cell densities of respective types of segmented cells on the micropattern chip, in which the SOX2-positive cells were mainly distributed inside the distance of 300 µm from the center, the brachyury-positive cells were mainly distributed between the distance of 400 µm to 500 µm from the center, and the Hoechst-positive cells that were not mapped to SOX2- and brachyury-positive were distributed at the outer part of the micropattern chip (i.e., between the distance of 400 µm to 500 µm from the center). Meanwhile, some extraembryonic cells were also located at the outer part of the micropattern chip. The SOX2- and brachyury-positive cells as depicted in FIG. 5A could be further divided into four respective subtypes depending on their intensities in the SOX2 and brachyury fluorescent images (FIGS. 5B and 5C).

Figure 6:
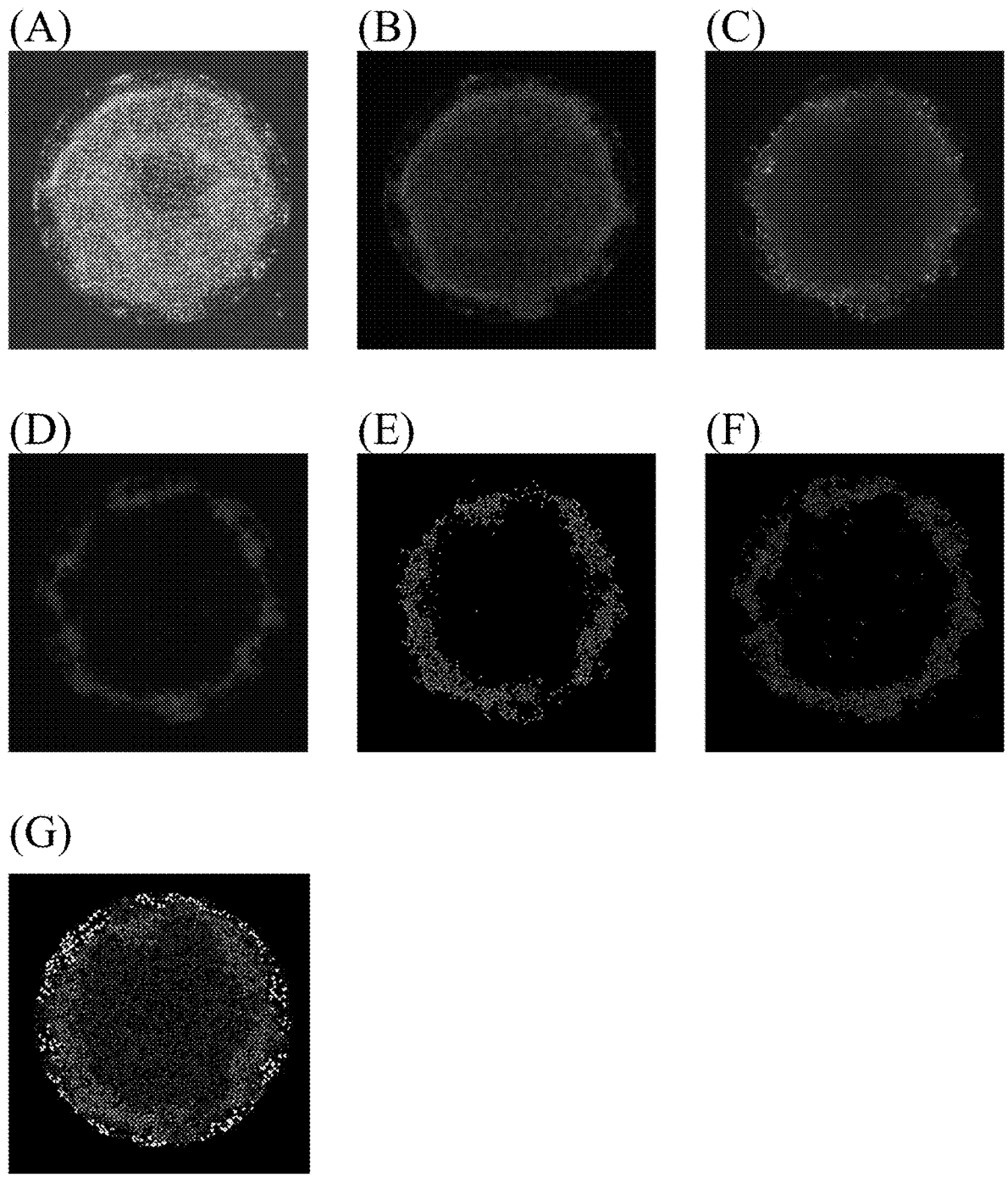
FIG. 6 depicts early differentiation stage of hiPSCs cultured on 1,000 μm micropattern chip of the Example 1 of the present disclosure. Panel (A): the bright-field image of hiPSCs. Panels (B) to (D): photographs of unprocessed Hoechst-positive cells (Panel (B)), brachyury-positive cells (Panel (C)) and SOX17-positive cells (Panel (D)). Panels (E) and (F): photograph of segmented cells assigned by brachyury fluorescence (Panel (E)) or SOX17 fluorescence (Panel (F)). Panel (G): photograph of segmented cells assigned by brachyury fluorescence, SOX17 fluorescence and extraembryonic cells.

In addition to analyze the spatial patterning of ectoderm and mesoderm subtypes, the effect of the present CNN model on characterizing mesoderm and endoderm subtypes was also examined. As described in Materials and Methods, the HiPSCs were stained with Hoechst dye, GFP conjugated anti-brachyury antibody, and RFP conjugated anti-SOX17 antibody. The data of Panels (A) to (D) of FIG. 6 respectively depicted the bright-field image, and the original Hoechst, brachyury and SOX17 fluorescent images. The Hoechst image was processed by the present CNN model, and the segmented hiPSCs were mapped to the SOX17 and brachyury fluorescent images. The segmented images mapping with the brachyury fluorescence image (green) and the SOX17 fluoresce image (red) were respectively depicted in Panels (E) and (F) of FIG. 6. The segmented image was alternatively mapped to a probability map generated by processing the bright-field image with a CNN model so as to identity extraembryonic cells (Panel (G) of FIG. 6).

Figure 7A:
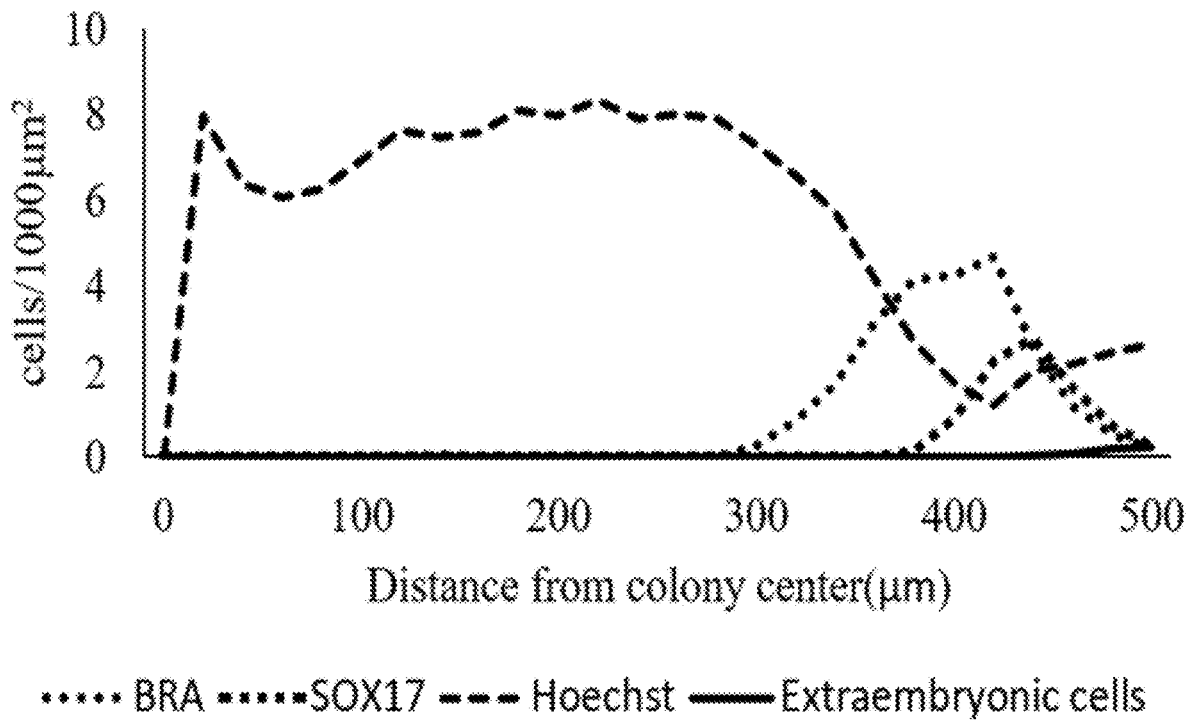
FIGS. 7A to 7C respectively depict the quantitative results of early differentiation stage of hiPSCs cultured on 1,000 μm micropattern chip according to the Example 1 of the present disclosure.
Figure 7B:
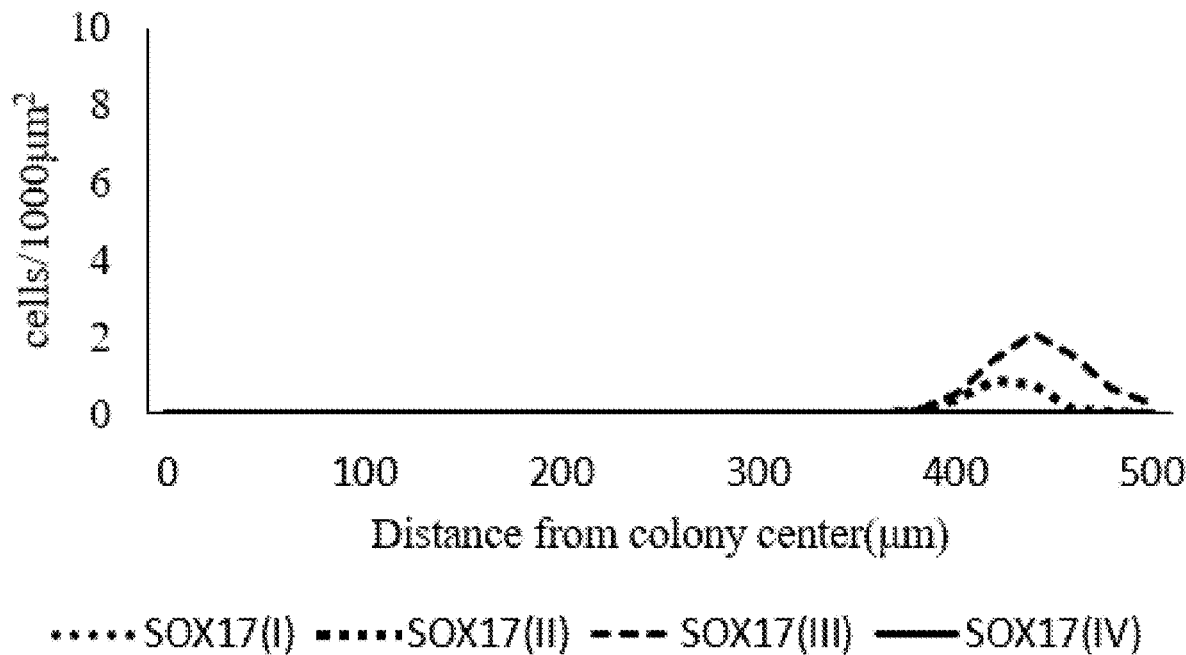
Figure 7C:
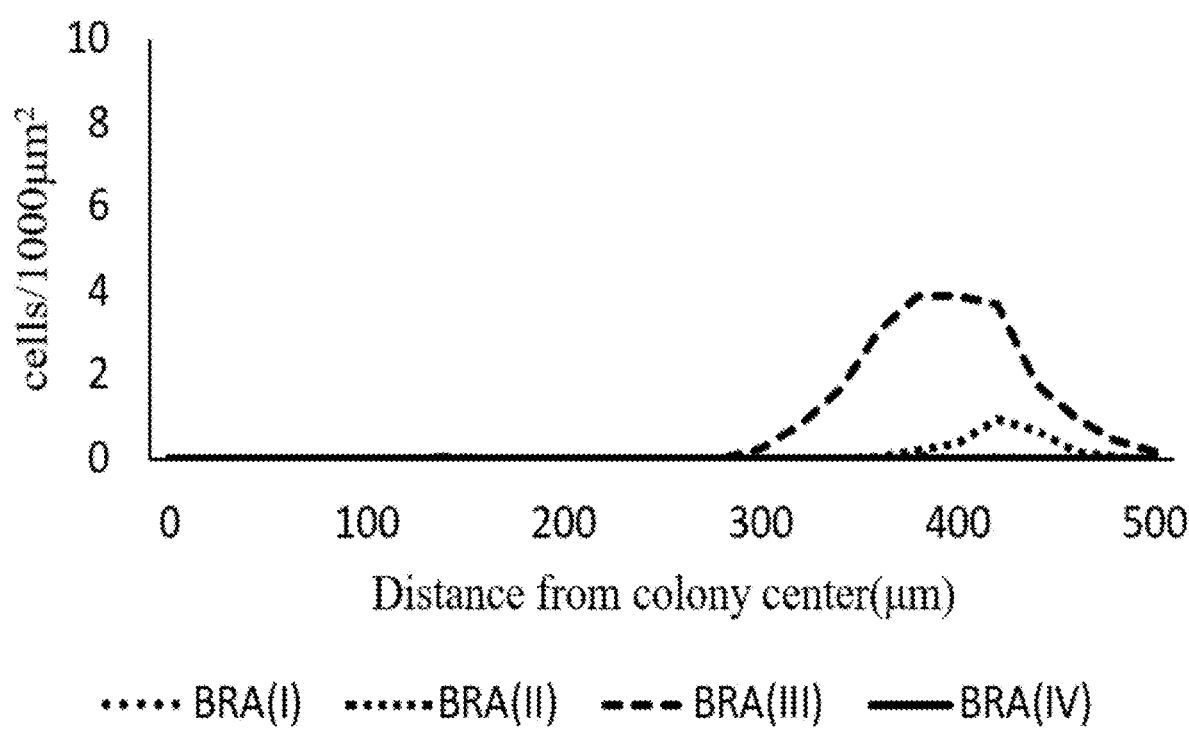

The data of FIGS. 7A to 7C indicated the cell densities of respective types of segmented cells on the micropattern chip, in which the SOX17-positive cells were mainly distributed inside the distance of 400 µm to 500 µm from the center, the brachyury-positive cells were mainly distributed between the distance of 300 µm to 500 µm from the center, and the Hoechst-positive cells that were not mapped to SOX17- and brachyury-positive were distributed within 400 µm from the center. Meanwhile, some extraembryonic cells were also located at the outer part of the micropattern chip. The SOX17- and brachyury-positive cells as depicted in FIG. 7A could be further divided into four respective subtypes depending on their intensities in the SOX17 and brachyury fluorescent images (FIGS. 7B and 7C).

The effect of the present CNN model in characterizing the spatial patterning of hiPSCs cultivated on 500 µm micropattern chip was also examined. The analytic results indicated that the SOX2-positive cells were mainly distributed inside the distance of 150 µm from the center, and the brachyury-positive cells were mainly distributed between the distance of 150 µm to 250 µm from the center (data not shown). The SOX2- and brachyury-negative, and Hoechst-positive cells were distributed at the outer part of the micropattern chip; meanwhile, some Hoechst-negative cells (i.e., extraembryonic cells) appeared at the outer part (data not shown).

Example 2 The Accuracy Evaluation for Segmented Cell Numbers and Regions

A Hoechst image (2560×2560), and its 4, 16, 25 and 64 divisions were used as input images to demonstrate the flexibility of the present CNN model. The classified cell numbers for these images were 6,098, 6,011, 6,015, 6,027 and 6,061, respectively. Compared to the manual ground-truth number 6,915, the accuracy (over 87%) was almost the same for all the image sizes, indicating the present CNN model having a modified U-Net architecture achieved the same accuracy for any image size, e.g., 1,000, 500 and 250 µm of micropatterns. By contrast, the classified numbers by the CNN model having a conventional U-Net architecture were 532, 2,016, 4,517, 5,196, and 4,285, respectively. The suitable input image size was 512×512 (25 divisions) where 75% accuracy was achieved by the conventional U-Net architecture (the accuracies of other input image size were much worse than that of the 512×512 image size), which was apparently worse than that of the present modified U-Net architecture. High and almost the same accuracy can be achieved by the present modified U-Net architecture for any input image size, i.e., an image from any size of micropattern.

Figure 8:
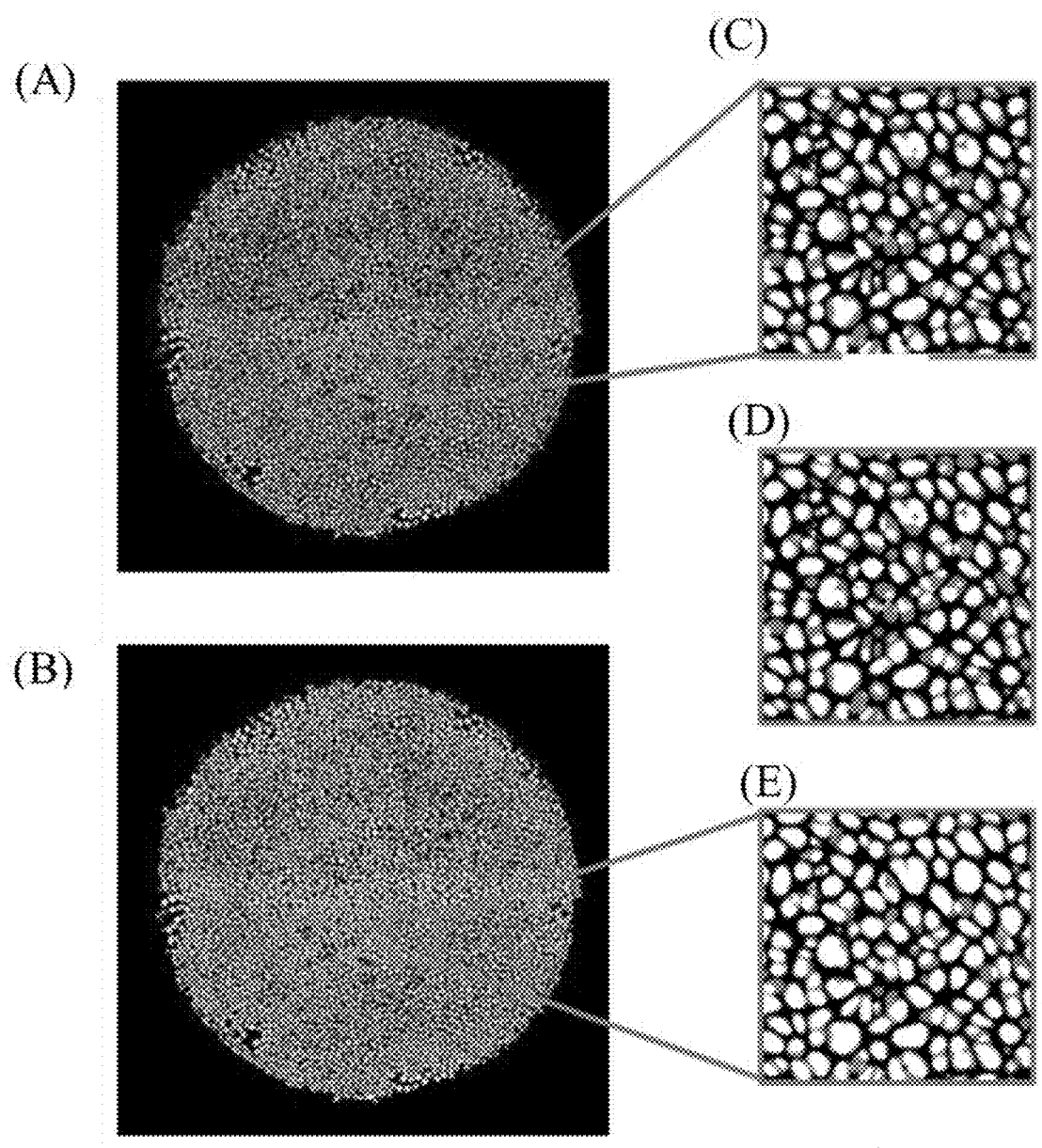
FIG. 8 depicts the images of the segmented cells according to the Example 2 of the present disclosure. Panels (A) and (B): photographs of segmented cells processed by the present U-Net architecture (Panel (A)) and conventional U-Net architecture (Panel (B)). Panels (C) to (E): enlarged images respectively from the indicated region of interest (ROI) of photographs of Panels (A) and (B).

FIG. 8 depicts the overlapping image of the segmented cells generated by the present CNN model having a modified U-Net architecture and the whole image (Panel (A) of FIG. 8), and the overlapping image of the segmented cells generated by the CNN model having a conventional U-Net architecture and the 25 divisions of the whole image (Panel (B) of FIG. 8). Panels (C) and (E) of FIG. 8 respectively are zoom-in images of indicated region of interest (ROI) of Panels (A) and (B) of FIG. 8, and Panel (D) of FIG. 8 is the same ROI zoom-in image of Panel (E) of FIG. 8, except the image was processed by the present CNN model. The region accuracy achieved about 90% for all the figures. However, other sizes of images processed by the CNN model having a conventional U-net achieved worse accuracy, e.g., 73% for the whole image. The cell connections between divided images classified by the present CNN model having a modified U-Net architecture (Panel (D) of FIG. 8) were also apparently better than by the CNN model having a conventional U-Net (Panel (E) of FIG. 8), indicating that the present U-Net architecture can classify out more accurate cell shapes.

In conclusion, the present disclosure provides a CNN model having a modified U-Net architecture that achieves high accuracy in measuring both the segmented cell number and regions of differentiating hiPSCs from Hoechst fluorescent microscopic images. According to the data of the present disclosure, the modified U-Net architecture improves the accuracy in identifying or analyzing images with compacted cells, and low signal-to-noise and boundary-to-area ratios, and accordingly is useful in medical image segmentation for diagnosis and/or treatment planning of diseases.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A system for identifying cells on a microscopic image, comprising,
   a non-transitory processor-readable medium that stores processor-readable instructions; and
   a processor communicably coupled to the non-transitory processor-readable medium and configured to,
   receive the microscopic image; and
   process the received microscopic image with a convolutional neural network (CNN) model, wherein the CNN model has a U-Net architecture comprising,
   a plurality of down-sampling sets for extracting the features of the microscopic image thereby generating feature maps; and
   a plurality of up-sampling sets respectively for generating a segmented image from the feature maps; wherein
   each down-sampling set comprises at least one convolution layer and at least one pooling layer preceded by the convolution layer; and
   the extraction is carried out by the plurality of down-sampling sets on a set-by-set basis by using equation (1), $$(x, y, C) = \left(\frac{h}{S^{i-1}}, \frac{w}{S^{i-1}}, 2^{F+i-1}\right), \quad (1)$$

where x and y are respectively the pixels of the height and width of an input image processed by each down-sampling set, C is the channel number of the input image, h and w are respectively the pixels of the height and width of the microscopic image, S is the stride of the pooling layer, i is the number of each down-sampling set in the plurality of down-sampling sets, and F is a constant for deciding the channel number of the input image.

2. The system of claim 1, wherein the pooling layer is a max-pooling layer.

3. The system of claim 2, wherein the S and F are respectively set to be 2 and 5.

4. The system of claim 1, wherein the CNN model is established by a CNN training method comprising,
   (a) inputting a plurality of training images to the CNN model to generate a plurality of predicted images;
   (b) generating a plurality of ground truth images respectively corresponding to the plurality of training images; and
   (c) determining a loss function for the CNN model based on the predicted images of step (a) and the ground truth images of step (b) by using equations (2)-(5), $$MPL(X, Y) = \alpha \times W(X, Y) + \beta \times D(X, Y), \quad (2)$$

$$W(X, Y) = \frac{1}{N}\sum_{j=1}^{N} E(X_j, Y_j) \times \gamma_j, \quad (3)$$

$$E(X_j, Y_j) = -Y_j \times \log X_j, \quad (4)$$

$$D(X, Y) = 1 - 2|X \cap Y|/(|X| + |Y|), \quad (5)$$

where W(X,Y) is a weight loss function, D(X,Y) is a dice loss function, α is the weight of W(X,Y), β is the weight of D(X,Y), N is the number of the training images, X is the pixels of each predicted image, Y is the pixels of each ground truth image, and γ is the weight of j category.

5. The system of claim 4, wherein the α and β are respectively set to be 1.1 and 0.9.

6. A non-transitory processor-readable medium storing processor-readable instructions, wherein the processor-readable instructions, when executed at a processor of a computing device, are capable of,
   receiving a microscopic image; and
   processing the received microscopic image with a convolutional neural network (CNN) model, wherein the CNN model has a U-Net architecture comprising,
      a plurality of down-sampling sets for extracting the features of the microscopic image thereby generating feature maps; and
      a plurality of up-sampling sets for generating a segmented image from the feature maps; wherein
      each down-sampling set comprises at least one convolution layer and at least one pooling layer preceded by the convolution layer; and
      the extraction is carried out by the plurality of down-sampling sets on a set-by-set basis by using equation (1), $$(x, y, C) = \left(\frac{h}{S^{i-1}}, \frac{w}{S^{i-1}}, 2^{F+i-1}\right), \quad (1)$$

where x and y are respectively the pixels of the height and width of an input image processed by each down-sampling set, C is the channel number of the input image, h and w are respectively the pixels of the height and width of the microscopic image, S is the stride of the pooling layer, i is the number of each down-sampling set in the plurality of down-sampling sets, and F is a constant for deciding the channel number of the input image.

7. The non-transitory computer-readable medium of claim 6, wherein the pooling layer is a max-pooling layer.

8. The non-transitory computer-readable medium of claim 7, wherein the S and F are respectively set to be 2 and 5.

9. The non-transitory computer-readable medium of claim 6, wherein the CNN model is established by a CNN training method comprising,
   (a) inputting a plurality of training images to the CNN model to generate a plurality of predicted images;
   (b) generating a plurality of ground truth images respectively corresponding to the plurality of training images; and
   (c) determining a loss function for the CNN model based on the predicted images of step (a) and the ground truth images of step (b) by using equations (2)-(5), $$MPL(X, Y) = \alpha \times W(X, Y) + \beta \times D(X, Y), \quad (2)$$

$$W(X, Y) = \frac{1}{N}\sum_{j=1}^{N} E(X_j, Y_j) \times \gamma_j, \quad (3)$$

$$E(X_j, Y_j) = -Y_j \times \log X_j, \quad (4)$$

$$D(X, Y) = 1 - 2|X \cap Y|/(|X| + |Y|), \quad (5)$$

where W(X,Y) is a weight loss function, D(X,Y) is a dice loss function, α is the weight of W(X,Y), β is the weight of D(X,Y), N is the number of the training images, X is the pixels of each predicted image, Y is the pixels of each ground truth image, and γ is the weight of j category.

10. The system of claim 9, wherein the α and β are respectively set to be 1.1 and 0.9.

11. A method for identifying a spatial pattern of human induced pluripotent stem cells (hiPSCs), comprising,
   (a) respectively labeling the nuclei and one of the germ layers of the hiPSCs with a first and a second molecules;
   (b) respectively obtaining a first microscopic image of the nucleus-labeled hiPSCs and a second microscopic image of the germ layer-labeled hiPSCs;
   (c) producing a segmented image by processing the first microscopic image with the system of claim 1;
   (d) superimposing the segmented image produced by step (c) on the second microscopic image of step (b); and
   (e) identifying the spatial pattern of the hiPSCs based on the superimposed image of step (d).

12. The method of claim 11, wherein the first molecule is a nuclear dye, and the second molecule is an antibody against one of the germ layers of the hiPSCs.

13. The method of claim 12, wherein the antibody is an anti-ectoderm, anti-mesoderm or anti-endoderm antibody.

* * * * *